United States Patent Office 3,028,397
Patented Apr. 3, 1962

3,028,397
ISOTHIOCYANATES OF PHTHALEINS
Kwan C. Tsou, Abington Township, Montgomery County, Pa., assignor to The Borden Company, New York, N.Y., a corporation of New Jersey
No Drawing. Filed Mar. 24, 1959, Ser. No. 801,448
2 Claims. (Cl. 260—335)

This invention relates to isothiocyanates of the phthaleins. It is particularly useful in connection with fluorescein isothiocyanate and will be first illustrated in connection with this use.

Fluorescein isocyanate is used as a biological stain, to "label" proteins that are to be subsequently examined microscopically, as in the "tagging" technique in the study of anti-bodies.

In such use of the fluorescein isocyanate, hydrolysis by moisture is a disadvantage. To decrease this hydrolysis, it is customary to distribute the isocyanate in dry acetone solution.

I have now made a product of satisfactory effectiveness as the tagging agent that is so stable that it may be kept in a bottle in crystal condition and dissolved in water at the time of application to the protein to be labeled.

Briefly stated, the invention comprises the isothiocyanates of the phthaleins and the process of making them.

The conversion of the phthalein amine to the isothiocyanate is shown below:

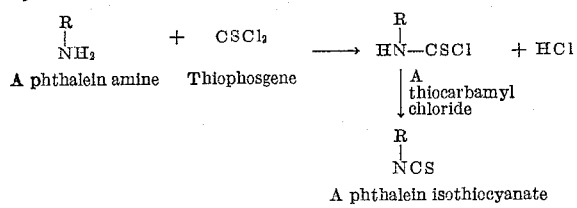

A phthalein isothiocyanate

In the type formula R—NH$_2$ for the phthalein amine, R represents the selected phthalein radical, i.e., the phthalein molecule less the hydrogen replaced by the amino group. In the case of fluorescein amine I, for example, R is

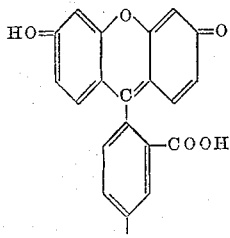

In all cases only the amino group enters into the chemical reaction.

As the starting material, I use the amine of any commercially available phthalein, this term including the acids, i.e., the phthaleins with an unneutralized carboxy group; their alkali metal salts such as sodium, potassium, lithium, and ammonium mono- or di- salt; and substitution products. The substitution products are those with 1–4 halogens (chlorine, bromine, or iodine) to the molecule or 1–4 alkyl groups (each with 1–3 carbon atoms) replacing 1–4 hydrogens of the aryl nuclei. Examples are the amines of any fluorescein, eosin, rhodamine, phloxine, and phloxine B, including their salts and substitution products. For use of the isothiocyanate as a biological stain, the phthalein must be a fluorescent dye so that it shows a fluorescent color under the ultraviolet light with which it is to be tested.

The position of the amine group in the phthalein is suitably meta or para with respect to the carboxy group, this term including salts of the group ·COOH. Thus the fluorescein that I use may be either fluorescein amine I (meta, m.p. 215–220° C.) or fluorescein amine II (para, M.P. 315–316° C.).

The amines, when not available commercially are made by any standard technique for preparing a phthalein amine, such as that described by Coons and Kaplan (J. Exp. Medicine 91, 1, 1950). The phthalein compound serving as the raw material is selected to contain the particular phthalein group that is to appear in the final product, i.e., after introduction of the amino group into the phthalein by conventional means and then conversion of the amine group to the isothiocyanate radical by thiophosgene process.

Specific examples that illustrate the forms in which the phthaleins may be used are the following: fluorescein, 2,7-dimethylfluorane, eosin, erythrosine B, phloxine N, rhodamine B, chromogen red B, and rhodamine 6G.

The conversion of the selected phthalein to the amine, my starting material, is effected in manner conventional for converting a phthalein to an amine.

In an alternative and known method, the nitro-derivative of the phthalein to be used is first made and then reduced to the amine, all by usual procedures. An illustrative example of such procedure, starting in this case with phthalic acid or the anhydride, follows. 4-nitrophthalic acid or its anhydride is heated with resorcinol or other meta-substituted phenol at 195°–200° C. and the melt extracted with boiling hydrochloric acid to give the crude nitro-fluorescein. The crude nitro-fluorescein can then be separated into two isomers by chromatography or, for practical purposes, acetylated to the diacetates and the diacetates of the two isomers then separated by crystallization. The diacetate is then deacetylated by saponification. The reduction of the nitro group to the amine can be done in many different ways such as hydrogenation in the presence of Raney nickel as catalyst.

Other amines that I use are made by the same procedure, with substitution of the nitro-fluorescein by the corresponding nitro-derivative of the phthalein whose radical, R, is desired in the amine.

The isothiocyanate of the phthalein amine is commonly prepared by the reaction of thiophosgene, CSCl$_2$. I can, however, use alkyl esters of any thiocarbonic acid such as $$R'O-\overset{S}{\underset{\|}{C}}-SR'$$

in which R is a C$_1$—C$_3$ alkyl group, that is methyl, ethyl, isopropyl, or propyl. When the thiocarbonate is used, I modify the process to include the introduction of an accelerator of which the alkoxides of metals are examples.

The thiocarbonates may be used in the form of their ethers, as for instance, methyl, ethyl, and isopropyl xanthates which may be written $$R'O.\overset{S}{\underset{\|}{C}}-SR'$$

The metal alkoxides that I can use with the thiocarbonate esters are those soluble in the solvent medium used in the reaction mixture, e.g., aluminum, sodium or potassium methoxide, ethoxide or isopropoxide. Aluminum isopropoxide is recommended because of its high solubility in acetone and like solvents.

The solvent used to dissolve the whole reaction mixture is suitably acetone, methyl ethyl ketone, cyclohexanone, diacetone alcohol or the like. Ethers, although less satisfactory, may be used. Examples are methyl, ethyl, isopropyl, and butyl diethers. Mixtures are satisfactory, including mixtures of benzene, toluene or naphtha with one of the ketones listed, as in the proportion of about 5–20 parts of the hydrocarbon mixture for 100 of the total solvents.

In general the lower boiling solvents are chosen because of convenience of separation, at the end, from the products of the reaction.

The phthalein amine and the agent such as the thiophosgene may be used in about equimolecular proportions. For most economical results, however, an excess of the less costly reactant, the said agent, is used particularly since it is readily separated at the end from the isothiocyanate.

The solvent should be sufficient in amount to dissolve the materials at the start of the reaction. I use about 2–10 parts of the solvent, to 1 part of the phthalein amine although the proportion of the solvent may be varied somewhat more widely, as within the range 1–25 parts to 1 of the amine.

When the metal alkoxide is used, it is in catalytic proportion such as 1–5 parts for 100 of the phthalein amine.

As to the conditions, I keep the temperature of the reacting mixture to advantage at about atmospheric or room temperature. I can work over a range in which the minimum is the lowest temperature at which the reaction is sufficiently rapid to be of commercial importance and the maximum is below that temperature at which decomposition of the intermediate product, the thiocarbamylchloride, occurs to an appreciable extent of any component of the mixture is lost otherwise, as by being boiled away. A suitable range is approximately room temperature, as about 0°–50° C., although temperatures outside this range may be used if the disadvantages referred to do not arise or if they can be accepted in a given preparation.

The reaction is continued until heat evolution from the initial exotherm substantially ceases. This will usually be the condition after 1–7 days of standing of the mixture at atmospheric or room temperatures or a shorter period at somewhat higher temperatures. The product is the desired isothiocyanate. The reaction mixture is then further concentrated by evaporation of the solvent medium, so that the isothiocyanate separates as a solid, either during the evaporation or during the subsequent cooling or both.

After no more substantial amounts of the phthalein isothiocyanate separate, it is removed without change of state of any material present as by filtration, centrifuging, or settling and decantation. The retained isothiocyanate is washed with a solvent for other components of the reaction mixture, a petroleum ether being suitable.

The washed phthalein isothiocyanate is then dried by exposure to the atmosphere or in any other suitable manner.

The invention will be further illustrated by description in connection with the following specific examples. In these examples and elsewhere herein proportions are expressed as parts by weight unless specifically stated to the contrary.

Example 1

Into a vessel having glass or enamel inner surface and provided with agitating and cooling equipment, there were introduced 75.5 parts of thiophosgene (0.66 mole) in 100 of dry acetone and then slowly a solution of 25 parts of fluorescein amine I (0.072 mole) dissolved in 120 of dry acetone. The slow addition required 1 hour. Then the cooling was decreased. The mixture was next stirred for 1 more hour at room temperature and subsequently kept at about 20° C. for 3 days, so that the fluorescein thiocarbamylchloride first formed undergoes conversion to the isothiocyanate. At the end of this time, there was some solid precipitated.

The solution was concentrated by evaporation at 50° C. to about half its original volume to cause separation of more of the solid product fluorescein isothiocyanate. This product was filtered out and washed with 40 parts of petroleum ether and then dried, to leave 10.5 parts of an orange-brown material of M.P. 109–111° C. This yield represented 40% of theory, from the one evaporation.

Qualitative test for the presence of sulfur in the product proved positive. The product, when examined by infrared spectroscopy, exhibited a band of moderate intensity in the isothiocyanate region, at 4.8 microns. (Materials of known structure, —N=C=S, show a band at approximately the same position.) This band is considered to be due to resonance structure of the isothiocyanate.

Example 2

The proportions and procedures of Example 1 were used with the exception that the fluorescein amine I (meta) was replaced with an equal proportion of the fluorescein amine II (para).

The final product when examined by the infrared spectroscopic method again showed the band at 4.8.

Both the products of Examples 1 and 2 were stable in storage in a closed bottle and also were applicable, in water-acetone solution, to the protein to be dyed, all without appreciable decomposition of the isothiocyanate. The products were orange-tan in color. When applied to gamma globulin and like proteins, the treated proteins under ultraviolet light showed a brilliant blue fluorescence.

Example 3

The composition and procedure of Example 1 are used except that the thiophosgene there used is replaced by an equimolar proportion of di-ethyl thiocarbonate, here the dithiocarbonate, and there is also introduced aluminum isopropoxide in the proportion of 0.5 part. The mixture is then maintained for a week at room temperature (20–40° C.). After being refluxed again over night, the product is the fluorescein isothiocyanate and the byproduct is in this instance ethyl alcohol, the aluminum isopropoxide being left largely as such.

The overall reaction with the amine group is represented as follows:

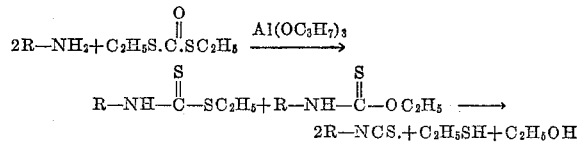

Example 4

The composition and procedure of Example 1 are followed except that the fluorescein amine there used is replaced, in turn, by an equimolar proportion of (1) eosin amine, the amine being in the position of meta or para to the carboxy group, (2) commercial eosin G, (3) uranine, i.e., the sodium salt of fluorescein amine, (4) rhodamine 6 G amine, (5) the sodium salt thereof, (6) rhodamine B amine, (7) the potassium salt thereof, (8) phloxine N amine, and (9) phloxine B amine.

The products made as described may be used as photosensitive dyes, but more suitably for labeling proteins as biological stains because of economic considerations.

In such use, my isothiocyanates are applied to the fabric to be dyed or to the protein to be labeled in the same proportion and manner that is conventional with the fluorescein isocyanate. In a variation of the conventional technique, my isothiocyanates are applied in dispersion in a water or in an aqueous solvent such as 50 parts of water to 50 of acetone.

It is to be understood that it is intended to cover all changes and modifications of the examples of the invention herein chosen for the purpose of illustration which do not constitute departures from the spirit and scope of the invention.

I claim:

1. The process of making a phthalein isothiocyanate which comprises mixing an alkyl thiocarbonate having 1–3 carbon atoms to the molecule with an amine of a phthalein selected from the group consisting of fluorescein, eosin, rhodamine, phloxine, and their alkali metal salts, an organic liquid solvent for the said thiocarbonate and amine that is chemically non-reactive with both, and a metal alkoxide that is soluble in the said solvent, maintaining the materials of the resulting mixture in contact with each other until chemical change substantially ceases, said change giving the isothiocyanate of the selected phthalein, and then separating the said isothiocyanate from other materials in the reaction mixture, the proportion of the said thiocarbonate used being at least approximately 1 mole for 1 of amine.

2. The process of claim 1, the said metal alkoxide being selected from the group consisting of aluminum, sodium and potassium methoxides, ethoxides and isopropoxides and the proportion thereof being about 1–5 parts for 100 parts of the said amine.

References Cited in the file of this patent

UNITED STATES PATENTS 2,937,186     Burckhalter et al. _____ May 17, 1960

OTHER REFERENCES

Riggs, J. L., Masters Thesis, Univ. of Kansas (1957), pages 10 and 16 relied on.